(12) United States Patent
Buck et al.

(10) Patent No.: US 7,487,851 B2
(45) Date of Patent: Feb. 10, 2009

(54) METHOD AND APPARATUS FOR CONTROLLING A HYBRID POWER SUPPLY SYSTEM IN A VEHICLE

(75) Inventors: Michael Buck, Bad Teinach-Zavelstein (DE); Joerg Schuetz, Ludwigsburg (DE)

(73) Assignee: Daimler AG, Stuttgart (DE)

( * ) Notice: Subject to any disclaimer, the term of this patent is extended or adjusted under 35 U.S.C. 154(b) by 547 days.

(21) Appl. No.: 10/522,244

(22) PCT Filed: Jul. 2, 2003

(86) PCT No.: PCT/EP03/07030

§ 371 (c)(1),
(2), (4) Date: Sep. 13, 2005

(87) PCT Pub. No.: WO2004/014687

PCT Pub. Date: Feb. 19, 2004

(65) Prior Publication Data

US 2006/0102397 A1 May 18, 2006

(30) Foreign Application Priority Data

Jul. 25, 2002 (DE) ................................. 102 33 821

(51) Int. Cl.
*B60K 1/00* (2006.01)
*B60K 6/00* (2007.10)

(52) U.S. Cl. .................... 180/65.2; 180/65.1; 180/65.3; 180/65.4

(58) Field of Classification Search ............... 180/65.1, 180/65.2, 65.3, 65.4
See application file for complete search history.

(56) References Cited

U.S. PATENT DOCUMENTS

| | | | |
|---|---|---|---|
| 4,839,246 A | 6/1989 | Takabayashi | |
| 5,334,463 A | 8/1994 | Shindo et al. | |
| 5,714,874 A | 2/1998 | Bonnefoy | |
| 6,555,928 B1 | 4/2003 | Mizuno et al. | |
| 2002/0095247 A1 | 7/2002 | Burba et al. | |
| 2002/0198636 A1* | 12/2002 | Uenodai et al. | 701/22 |
| 2003/0129459 A1* | 7/2003 | Ovshinsky et al. | 429/9 |
| 2004/0214061 A1* | 10/2004 | Sugiura et al. | 429/23 |
| 2005/0197751 A1* | 9/2005 | Koike | 701/22 |
| 2006/0102398 A1* | 5/2006 | Mizuno | 180/65.3 |
| 2006/0272868 A1* | 12/2006 | Fuse et al. | 180/65.1 |

FOREIGN PATENT DOCUMENTS

| | | |
|---|---|---|
| DE | 197 31 250 A1 | 7/1997 |
| DE | 198 10 467 C1 | 3/1998 |
| EP | 0 334 474 B1 | 2/1989 |
| EP | 1 160 120 A | 12/2001 |
| JP | 2002-112408 | 4/2002 |
| WO | WO 01 34424 A | 5/2001 |
| WO | WO 02 29916 A | 4/2002 |
| WO | WO 02 36385 A | 5/2002 |

* cited by examiner

*Primary Examiner*—Christopher P Ellis
*Assistant Examiner*—John R Olszewski
(74) *Attorney, Agent, or Firm*—Crowell & Moring LLP (57) ABSTRACT

A method and an arrangement for controlling the power supply of a vehicle which has a hybrid power system composed of a fuel cell system and a dynamic power system which contains a storage battery. The power system can be operated with optimum dynamics as a function of operating modes which can be set.

3 Claims, 5 Drawing Sheets

METHOD AND APPARATUS FOR CONTROLLING A HYBRID POWER SUPPLY SYSTEM IN A VEHICLE

BACKGROUND AND SUMMARY OF THE INVENTION

This application claims the priority of German patent document 102 33 821.3, filed 25 Jul. 2002 (PCT International Application No. PCT/EP2003/007030), the disclosure of which is expressly incorporated by reference herein.

The invention relates to a method and apparatus for controlling a hybrid power supply system in a mobile device having at least one electric drive motor, a fuel cell system and a dynamic power system. The electrical outputs of the fuel cell system are connected to one side of a power converter whose other side feeds the drive motor which is controlled by a motor control unit. The dynamic power system has a storage battery which is connected to one side of a d.c./d.c. converter whose other side is connected to the electrical outputs of the fuel cell system and to one side of the power converter.

Power supply systems for an electric vehicle which has a fuel cell and a storage battery that can be connected in parallel with it are known. The electrical outputs of the fuel cell are connected to a motor for driving the vehicle, and to a d.c./d.c. converter to which auxiliary machines in the vehicle are connected. The power supply system contains a residual charge monitoring device for measuring the residual charge of the storage battery when the power supply system stops operation. If the residual charge is then less than a predefinable limiting value, the fuel cell charges the storage battery to the limiting value. The power supply system is not shut down until after such charging is completed. (See German patent document DE 197 31 250 A1.)

Hybrid drive vehicles which have, as a power source, a fuel cell that feeds an electric drive motor are known. Such vehicles contain a power accumulator and electrical secondary loads. Two separate circuits which are provided, with switching devices for optionally connecting the motor and the secondary load to the fuel cell or to the power accumulator, and a switchable connection between the fuel cell and the power accumulator are provided in the vehicle (German patent document DE 198 10 467 C1).

European patent document EP 0 334 474 B1 discloses a fuel cell system which includes a fuel tank, a reformer, a fuel cell, and a d.c./d.c. converter that is connected to the electrical outputs of the fuel cell. A load is connected to the d.c./d.c. converter and a storage battery is connected in parallel therewith. The fuel cell system contains a control unit which senses residual charge of the storage battery, and ensures that the storage battery is charged to a predefinable charge state in the shortest possible time.

Finally, U.S. Pat. No. 5,714,874 discloses a power supply system that comprises a fuel cell, a d.c./d.c. converter which is connected to the electrical outputs of the fuel cell, and a load which is connected to the outputs of the d.c./d.c. converter. A storage battery is connected in parallel with the load. A control unit regulates the current flowing via the d.c./d.c. converter such that the output voltage of the fuel cell remains within a predefined range.

One object of the invention is to provide a method and apparatus for controlling a power supply of a mobile device having at least one electric drive motor and a hybrid power system composed of a fuel cell system and a dynamic power system, such that the hybrid power system operates in an optimum way in terms of the required dynamics, with adaptation to the parameters and/or operating states.

This and other objects and advantages are achieved by the method according to the invention in which, for a particular setpoint power request, multiple signals are processed to determine the components of the requested setpoint power that will be provided, respectively, by the fuel cell system and by the dynamic power system. The signals which are processed for this purpose include signals generated by a signal transmitter for requesting the setpoint power of the drive motor, a signal from an operating mode switch (which has a plurality of selectable settings that are assigned to different types of dynamic behavior of the device), signals from power sensors for the output current and voltage of the fuel cell and signals from a sensor for the velocity of the mobile device. When there is a change in the setpoint power, the difference between the partial power that can be generated by the fuel cell system (with a delay according to the transition function) and the setpoint power is provided by the storage battery of the dynamic power system, by applying corresponding setpoint values to the d.c./d.c. converter, considering the power of the drive motor which has already been output and the power of the fuel cell system which has already been generated as well as the velocity of the device, and taking into account the selected type of dynamic behavior and the different transition functions of the fuel cell system and of the dynamic power system. Based on the power demand of the mobile device (which depends on the setpoint value of the torque, the setting element and the measured values of the sensors, and which is calculated from the signals, position sensors and measured values), the power demand can be adapted to the fuel cell system in a suitable way, (i.e., with a favorable efficiency and/or favorable time behavior), while the storage battery supplies the power contribution for rapid dynamics of the mobile device.

In the case of a sudden increase or decrease in the setpoint power, the resultant corresponding increase or decrease in the current flowing out of or into the storage battery via the d.c./d.c. converter is limited in particular to a maximum prescribable discharge current or charge, determined, for example, by the type of the storage battery used.

In one preferred embodiment, from a vehicle control unit of the mobile device load, current values of additional loads in the device are superimposed on the power demand values for the drive motor which are determined from the setpoint power. The result is fed (with a charge current value generated when necessary by a battery management system) to a power control unit with limitation to a predeterminable fuel cell maximum power value of a power control unit. The power control unit also receives velocity values, torque setpoint values from a setting element, battery charge state values and the setting of the operating mode selector switch. As a function of the fed values, the power control unit calculates the values of the overall power demand, portions which is to be contributed by the fuel cell system taking into account its inertia behavior and the selected dynamic behavior, and outputs corresponding setpoint values to the actuating elements of the fuel cell system. In each case the values of the current which is output by the fuel cell are determined and subtracted from the value of the current required by the drive motor; and the result is fed as current setpoint values to the d.c./d.c. converter with limitation to a maximum specifiable discharge current or charge current of the storage battery. The power control unit detects, by reference to the values fed to it, the operating mode and the operating state of the mobile device and concludes therefrom the type of current contribution which the fuel cell system must make for the power converter and the auxiliary drive. The storage battery provides the current contributions for the high-speed dynamic demand levels.

The method according to the invention permits rapid setting of the current in order to achieve satisfactory driving dynamics, by the d.c./d.c. converter.

In a further favorable embodiment, the sum of the current which is drawn from the drive motor (via the power converter) and the currents which are drawn from the other loads of the device are subtracted from the value of the current that is output by the fuel cell, and when a maximum predefinable value of the discharge current of the storage battery is reached, it is limited to its discharge current. The result of the difference between the values of the currents which are drawn from the further loads is added to the value of the available fuel cell current and signaled to the control unit of the device as an available value of the current. The available current is a dynamic current in response to the demand for a current. The fuel cell system meters the amount of fuel sufficient for this current to be drawn. The control unit is therefore capable of matching the current demands made of the mobile device to the respective available values of the current.

Its particularly advantageous, that the response function of the fuel cell system is simulated as a controlled system, using a memory element of the n-th order. The torque setpoint value which is output by the vehicle control unit of the mobile device is applied to the memory element and to a control unit for the dynamic power system, and the values generated according to the response function of the controlled system are fed to the control unit. The current which is to be applied by the dynamic power system as a current setpoint value is supplied to the d.c./d.c. converter by the control unit by means of a limiter element with a ramp, the gradient of which can be set to at least two values as a function of control signals from the device. This embodiment achieves especially good overall dynamics, and the efficiency of the dynamic power system is exploited to an optimum degree. For example, during rapid starting of the mobile device (i.e., at the commencement of starting and with low power of the fuel cell system), the power is applied by the dynamic power system so that the large torque necessary to accelerate the device is rapidly available. At high rotational speeds, the power for the acceleration in order to reach a high rotational speed is output by the dynamic power system. A sliding transition of the power contributions of the fuel cell and power system is achieved by means of the power control unit.

In order to achieve high acceleration during an acceleration of the device (when the setpoint torque is determined by the vehicle control unit by pilot control and a maximum current for the generation of the setpoint torque is determined from a characteristic diagram with the torque as a function of the maximum current and the rotational speed), the difference between the current generated by the fuel cell system during the acceleration and the overall current which is required by the dynamic power system according to the characteristic diagram in order to achieve the high acceleration, is generated. With this embodiment, particularly good longitudinal dynamics are generated in a mobile device, in particular an electric vehicle, since utilization of the dynamic power system is optimized.

In order to utilize the power of the mobile device satisfactorily, the excess energy occurring when the load of the drive motor is reduced is recovered and stored in the dynamic power system.

The d.c./d.c. converter is also set in such a way that it feeds current into the storage battery and charges it when there is a negative load jump, (i.e., due to a corresponding change in the actuating element for the power to be output by the drive motor, the power converter is set to reverse mode). The charge current is determined by the charge controller which controls the charge currents across the d.c./d.c. converter as a function of the charge state of the storage battery. When there is a reduction in the setpoint torque to be output by the drive motor as a result of the presetting of a lower torque setpoint value, the current which is necessary for the lower torque is preferably determined from the characteristic diagram. With reference to the current load state of the fuel cell system, given the presetting of the lower torque setpoint value and the storage capacity of the storage battery, the latter is charged with the maximum permissible charge current by means of the d.c./d.c. current after the reversal of the flow of current in the power converter, and the fuel cell system is set to the current which is necessary for the lower setpoint torque. This measure avoids the risk of overheating of the fuel cell system.

In another preferred embodiment, the direction of the supply of combustion gas and air to the fuel cell is reversed periodically, and during such reversal, a current pulse matched to the instantaneous output of current of the fuel cell system and/or of the dynamic power system directly before the changeover is fed in to the power converter by the dynamic power system via the d.c./d.c. transformer. This avoids undesired fluctuations in the drive torque.

It is also expedient to monitor the output voltage of the fuel cell system to determine when a voltage limiting value that is permissible for satisfactory operation is reached or undershot. When the voltage limiting value is reached, the voltage in the power system which is connected to the output of the fuel cell is regulated to at least the permissible limiting value by feeding in current via the d.c./d.c. current. In particular, the load situation of the power supply system during the intervention of the regulating process and the frequency of intervention of the voltage regulating process during the operation of the power supply system are registered. After a predefinable number of interventions have been exceeded the dynamics are limited by reducing the rate of increase in the current of the fuel cell system and/or the dynamic power system and the magnitude of the power which is output.

It is advantageous to limit the rate of increase in the output power of the fuel cell system given sufficient storage battery charge when the torque setpoint value is increased, and to supply the current necessary to output the torque setpoint value, from the dynamic power system during the increase in the output power. In this context it is advantageous for operation of the power supply system with a high level of efficiency to approach the load state of the fuel cell system which is demanded by the torque setpoint value by means of a ramp with a low rate of increase.

It is particularly expedient if at least three operating modes for the drive motor can be set by means of the operating mode selector switch, one operating mode of which is aimed at a high level of dynamics of the mobile device, a second of which is aimed at a low level of dynamics with high efficiency and a third of which is aimed at a stop and go operating mode. When accelerations occur in the stop and go operating mode, currents are generated for the drive motor by the dynamic power system and stored therein during braking.

The portion of the current to be supplied by the dynamic power system which is formed by the current necessary to generate a requested drive power, in particular with the existing actual value of the current consumed by the mobile device, and the current available from the fuel cell system is determined.

In the case of reduced power of the fuel cell system, an emergency operating mode of the power supply system is preferably ensured by a voltage regulating mode in the high voltage power system, by means of the d.c./d.c. converter and by supplying current from the storage battery.

In the power supply control apparatus according to the invention, a vehicle control unit is connected to a velocity sensor of the mobile device and to a signal transmitter for a setpoint torque (to be generated by the drive motor). The vehicle control unit establishes the setpoint torque for a motor control unit, and determines the current setpoint values for the mobile device which are stored in a characteristic diagram for torque values and rotational speed values. The vehicle control unit is connected to the power control unit which is connected to the fuel cell system, a battery management system for the storage battery and to the d.c./d.c. converter. The current output by the fuel cell is measured and is fed as a fuel cell current value to the power control unit. The current of the drive motor is measured upstream of the power converter and is fed as a driving current value to the power control unit. The currents of the other loads are measured or calculated and fed to the power control unit as a composite current value. An operating mode selector switch for setting various types of dynamic behavior of the power supply system is connected to the power control unit. Values relating to the charge state of the storage battery, from the battery management system, and values relating to the maximum prescribable charge current and discharge currents are fed to a power flux controller in the power control unit. The power setpoint value, the fuel cell current value, the driving current value, the composite current value, the operating mode set with the operating mode selector switch, the charge state value and the maximum prescribed values of the charge and discharge currents are processed in the power control unit and in the associated power flux controller, with one or more programs. When there is a change in the setpoint power, the difference between the partial power that can be generated by the fuel cell system (with a delay according to the response function) and the setpoint power, is supplied by the storage battery of the dynamic power system by applying corresponding setpoint values to the d.c./d.c. converter, considering the power of the drive motor which has already been output and the power of the fuel cell system which has already been generated as well as the velocity of the device, and taking into account the selected type of dynamic behavior and the different response functions of the fuel cell system and of the dynamic power system. The current which is to be contributed by the battery is determined from the vehicle current and the available current of the fuel cell, which takes only a very short time.

Other objects, advantages and novel features of the present invention will become apparent from the following detailed description of the invention when considered in conjunction with the accompanying drawings.

DETAILED DESCRIPTION OF THE DRAWINGS

Figure 1:
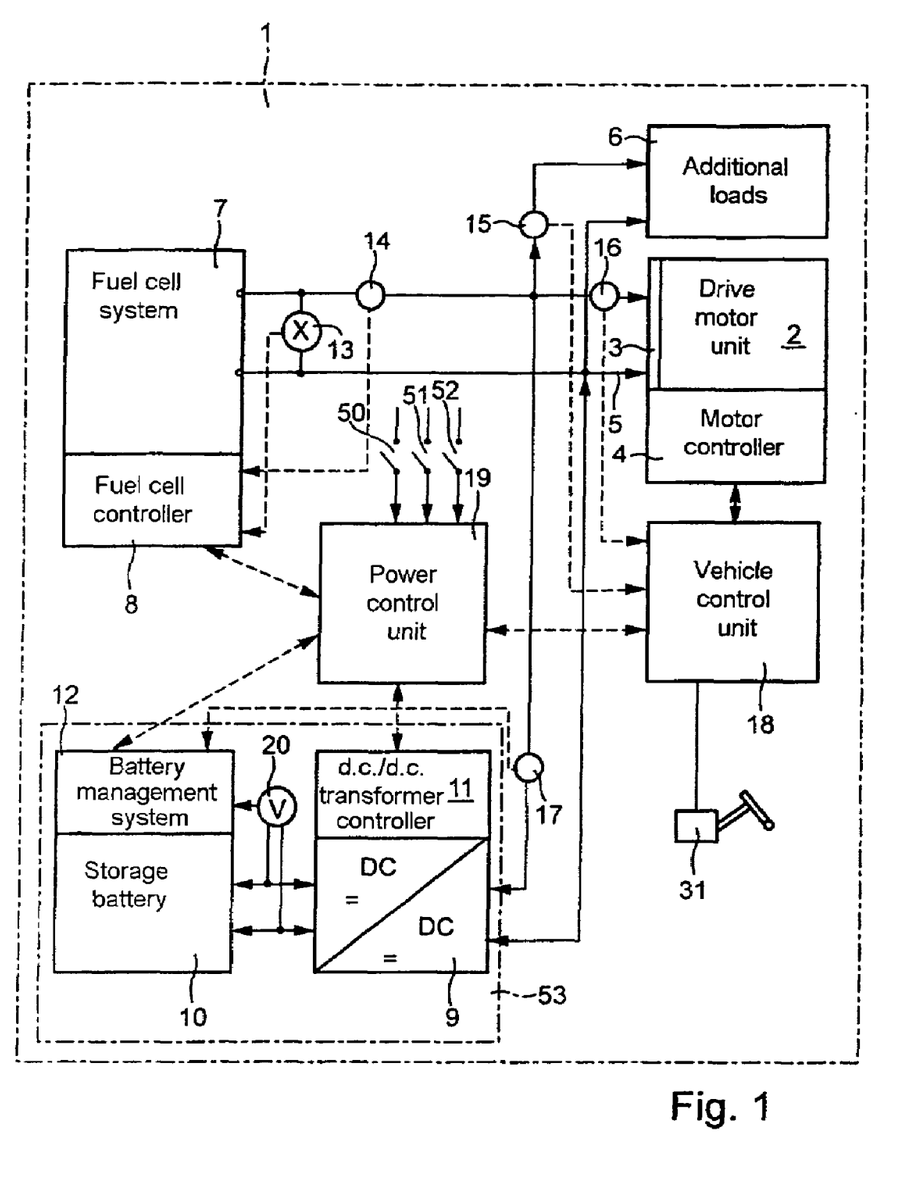
FIG. 1 is a block circuit diagram of an arrangement for controlling the power supply of a mobile device having a fuel cell system and a dynamic power system as well as a power control unit and at least one electric drive motor.

A mobile device, in particular a vehicle 1 (or alternatively, a locomotive or a fork lift truck), contains a drive motor unit 2 which includes a power converter 3 connected to a motor (not illustrated in more detail), which may be an asynchronous motor. The rotational speed or torque of the motor is controlled by a motor controller 4 by means of the power converter 3. The power converter 3 is connected at its terminals which are opposite the motor to a d.c. power system 5 (referred to as a high voltage power system, and having a voltage in the range from 250 to 450 V). In addition to the drive motor unit 2, there are other power loads 6 in the vehicle 1. These loads are, for example, a compressor, a ventilator, a water pump, the loads of an air conditioning system and a d.c./d.c. converter between the high voltage system and a 12 V, 24 or 42 V low voltage power system with further loads such as headlights, windshield wiper motors, window drives, indicator flasher lights etc.

The d.c. power system 5 is connected to the electrical outputs of a fuel cell system 7, which includes a fuel cell. The fuel cell system 7 contains elements which are known per se, such as a fuel tank with liquid fuel (for example methanol), a reformer, a water tank and a compressor as well as a fuel cell to which combustion gas is fed from the reformer and air is fed from the compressor. A fuel cell controller 8 activates the actuating elements of the fuel cell system in order to cause them to output a corresponding amount of power. A d.c./d.c. converter 9 is also connected to the d.c. power system 5 and is designed for bidirectional operation; it is connected at its terminals facing away from the high voltage power system 5 to a storage battery 10 which generates, for example, a voltage of 200 V. Instead of a storage battery, a supercapacitor or some other power accumulator can also be provided.

A d.c./d.c. converter controller 11, which sets the direction of the current of the d.c./d.c. converter and the current level which is output and can reset the converter to a voltage regulating mode for the d.c. power system 5, is connected to the d.c./d.c. converter 9. The storage battery 10 is connected to a battery management system 12.

A voltage sensor 13 connected to the outputs of the fuel cell measures the d.c. voltage of the d.c. power system 5. The current output by the fuel cell (designated below as a fuel cell vehicle current) is measured by a current sensor 14. A current sensor 15 measures the current drawn by the additional loads (referred to below as an auxiliary current). A current sensor 16 measures the current which flows to the drive control unit 2 via the power converter 3 or is fed back from the power converter 3 (referred to below as the driving current). The current which flows from or to the d.c./d.c. converter at the d.c. power system end (referred to below as the d.c. converter current) is measured using a current sensor 17. The voltage of the battery 10 is measured using a voltage sensor 20 which is connected to the battery management system 12.

The motor controller 4 is connected to a vehicle control unit 18 via data lines which are shown by dashed lines in FIG. 1. A power control unit 19 is connected via data lines (illustrated by dashed lines in FIG. 1) to the vehicle control unit 18, the fuel cell controller 8, the battery management system 12 and the d.c./d.c. converter controller 11. The voltage sensor 13 and the current sensor 14 are connected to the fuel cell controller 8. The current sensor 15 and the current sensor 16 are connected to the vehicle control unit 18. The voltage sensor 20 and the current sensor 17 are connected to the battery management system 12 which monitors all the data of the battery 10, and continuously determines the charge current of the battery 10.

Figure 2:
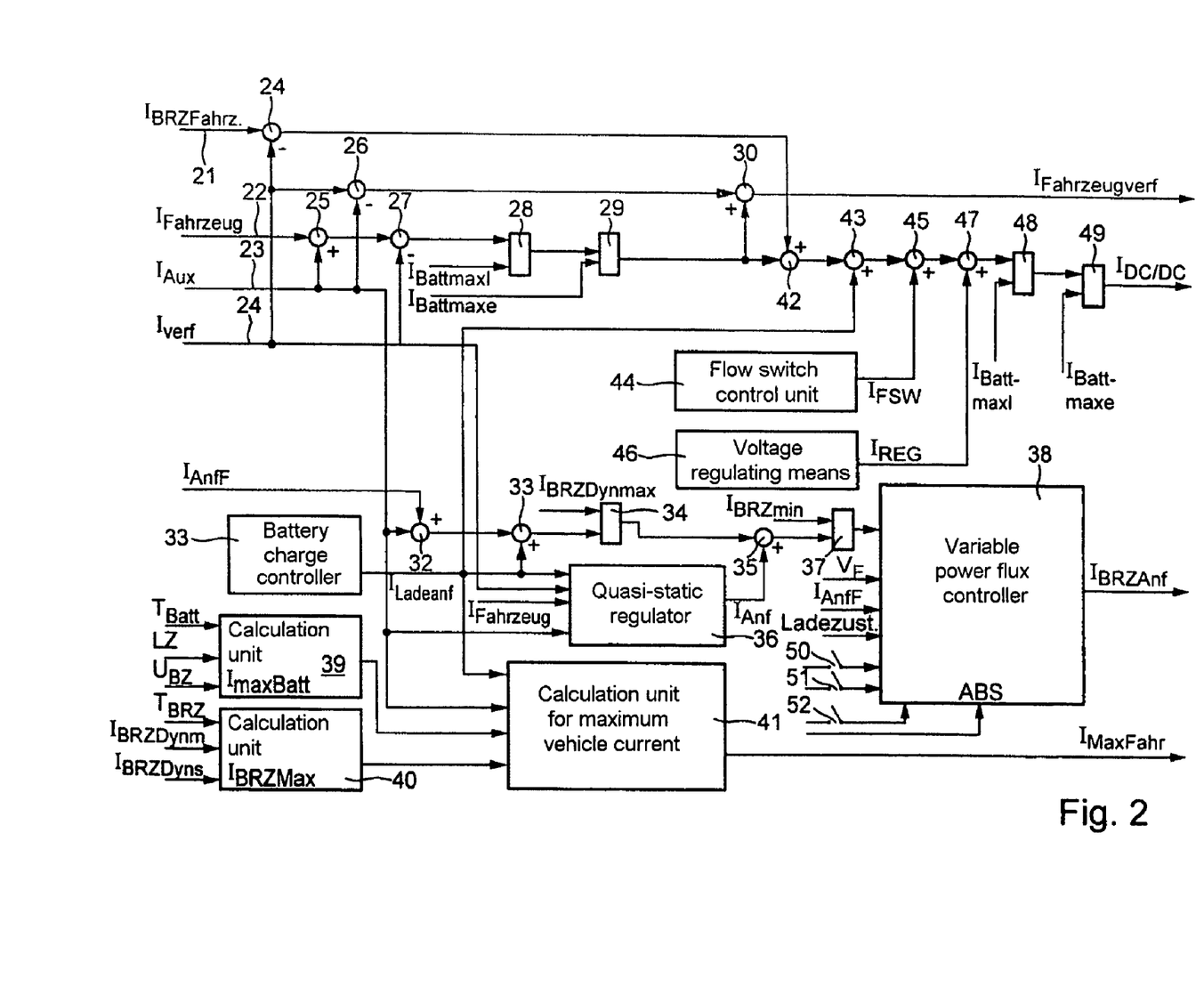
FIG. 2 is a block circuit diagram or signal flow diagram of the power control unit illustrated in FIG. 1.

The value of the fuel cell vehicle current which is measured by the current sensor 14 (referred to below as $I_{BRZFahrz}$, is signaled to the power control unit 19 via the fuel cell controller 8 on data line 21. The value of the current which is consumed by the drive motor (or if appropriate by a plurality of drive motors) at the time and which flows into the power converter 3 and is referred to below as $I_{Vehicle}$, is fed to the power control unit 19 on a data line 22. The value of the auxiliary current, referred to below as $I_{Aux}$, is signaled to the power control unit 19 on a data line 23. On a further data line 24, the value of the current which is made available by the fuel cell (referred to below as $I_{verf}$) is fed to the power control unit 19. (The value $I_{Verf}$ is a limiting value and indicates how much current can be drawn via the fuel cell.) This current $I_{Verf}$ is a dynamic value in response to a current value $I_{BRZAnf}$, which is output by the power flux controller 38 to the actuating elements of the fuel cell system 7. The fuel cell system 7 meters the quantity of fuel such that the current $I_{verf}$ can and has to be drawn. If too much current is drawn, the fuel cell is undersupplied. If too little current is drawn, too much $H_2$ is generated, which damages the reformer system. $I_{Verf}$ is thus a dynamic current which is also to be drawn.

The value $I_{BRZFahrz}$ is subtracted from the value $I_{Verf}$ which is represented in FIG. 2 by the summing point 24a. The current values $I_{Vehicle}$ and $I_{Aux}$ are superimposed one on the other, which is represented in FIG. 2 by a summing point 25. The value $I_{Aux}$ is subtracted from the value $I_{Verf}$ in a subtraction unit 26. The value $I_{Verf}$ is subtracted from the sum of $I_{Vehicle}$ and $I_{Aux}$ at a summing point 27. If the result ($I_{Vehicle}+I_{Aux}-I_{Verf}$) is greater than a maximum prescribable, stored discharge current value of the storage battery 10, The current value (referred to AS $I_{Battmaxl}$) is further processed in the comparator 28. The value which is passed on by the comparator 28 is fed to a further comparator 29 in which a comparison is made with a prescribable, stored maximum permissible discharge current which is referred to as $I_{Battmaxe}$ in FIG. 2. The value at the output of the comparator 29 is limited to this value if the input value is greater. The output value of the comparator 29 is superimposed on the difference $I_{Verf}-I_{Aux}$ at a summing point 30 and results in a current value $I_{Vehicleverf}$, which is fed to the vehicle control unit 18. For this reason, the maximum available current value is available to the vehicle control unit 18, so that this unit does not output any higher current demand.

The vehicle control unit 18, to which the power to be output by the drive motor is signaled by a setpoint value transmitter 31, calculates a setpoint current value for the vehicle (referred to below as $I_{AnsF}$) from the position of the setpoint value transmitter, the rotational speed of the drive motor (measured by a sensor), a table (stored in the trial operating mode) for the torque as a function of the current and the rotational speed. The setpoint current value is superimposed on the value $I_{Aux}$ at a summing point 32. A battery charge controller 33 which is part of the power flux control unit 19 monitors the charge state of the storage battery 10 by means of sensors (not illustrated in more detail) and generates, when necessary, a charge current demand, referred to $I_{Ladeanf}$, as a function of the measured battery temperature and the driving style which is determined from the measured rotational speed profile per time unit. The value $I_{Ladeanf}$ is superimposed on the sum of $I_{AnfF}$ and $I_{Aux}$ at a summing point 34. The result which is calculated at the summing point 32 is fed to a comparator 34 which determines whether the input value is greater than a maximum prescribable, stored, dynamic fuel cell current value, referred to below as $I_{BRZDynmax}$.

If the output value of the summing point is greater than $I_{BRZDynmax}$, this value is further processed at a summing point 35 at which a current value $I_{Anf}$ is superimposed. The value $I_{Anf}$ is calculated by a quasi-static regulator 36. The values $I_{Vehicle}$, $I_{Aux}$, $I_{Verf}$ and $I_{Ladeanf}$ from which the regulator $I_{Anf}$ calculates, are fed to the quasi-static regulator.

The sum which is formed at the summing point 35 is compared in a comparator 37 with a current minimum value, referred to below as $I_{BRZmin}$. This current minimum value is passed on to a variable power flux controller 38 if the result of the summing point 35 is smaller than this value.

The temperature value of the battery $T_{Batt}$ is fed by a sensor (not illustrated) to a calculation unit 39 for limiting values of the battery current, as are the load state of the battery LZ by the battery charge controller 33 and the value of the voltage of the fuel cell $U_{BZ}$. The calculation unit 39 determines a maximum battery current value $I_{MaxBatt}$ from these values.

A further calculation unit 40 for the maximum fuel cell current $I_{maxBRz}$ receives the maximum dynamic fuel cell current value $I_{BRZDynmax}$ from a temperature sensor (not illustrated) of the fuel cell $T_{BRZ}$, and a previously stored maximum static value, determined, for example, by trials, of the fuel cell system $I_{BRZmaxstat}$.

The value of the charge demand $I_{Ladeanf}$, the value $I_{Aux}$ and the values $I_{maxBatt}$ and $I_{BRZmax}$ are fed to a calculation unit 41 which determines therefrom the value of the maximum vehicle current $I_{maxFahr}$ and feeds it to the vehicle control unit 19.

At a summing point 42, the value of the output of the comparator 20 is superimposed, on the difference between $I_{BRZFahrz}$ and $I_{Verf}$, and the result is added to the value $I_{Ladeanf}$ at a summing point 43.

The fuel cell system 7 has a flow switch compensation function which compensates for the power dip when the direction of the gas supply to the fuel cell is reversed. A flow switch control unit 44 generates a current value $I_{FSW}$ which is added to the result from the summing point 43 at a summing point 45 during the switchover period.

In order to prevent the voltage in the high voltage power system 5 from dropping to a value is dangerous for the operation of the fuel cell, a voltage regulating unit 46 is provided with which the voltage of the high voltage power system is monitored to determine whether a lower limiting value is reached or undershot. As soon as this limiting value is reached or undershot, the voltage regulating unit 46 outputs a value $I_{REG}$ which is superimposed on the result of the output of the summing point 45 at a summing point 47. The value at the output of the summing point 47 is fed to a comparator 48 which limits this value to the maximum set charge current if the input current is larger.

The output value of the comparator 48 is fed to a further comparator 49 which limits the value to the maximum set discharge current $I_{Battmaxe}$ if the input value is higher. The output value of the comparator 48 is fed as a current setpoint value $I_{d.c./d.c.}$ to the d.c./d.c. converter controller 11.

The variable power flux controller 38, an essential component of the power control unit 19, receives measured values of the vehicle velocity $V_F$, of the setpoint value transmitter 31 relating to the setpoint torque $M_{soll}$ demanded by the drive motor, the value $I_{AnfF}$ from the vehicle control unit 18 and the battery charge state from the battery charge controller 33. Furthermore, an operating mode selector switch composed of a series of switches 50, 51, 52, with which a specific operating mode of the dynamic behavior of the vehicle 1 can be set manually is present in the vehicle 1. The switched positions of the switches 50, 51, 52 are fed to the variable power flux controller 38. In addition, a signal which relates to an antilock braking operation and signals this to the variable power flux controller 38 is fed to the variable power flux controller 38 by the vehicle control unit 18. The power flux controller 38 processes these values and outputs a value $I_{BRZAnf}$ to the actuating elements of the fuel cell system 7.

The storage battery 10 with the battery management system 12 and the d.c./d.c. converter 9 with the d.c./d.c. converter controller 11 form a dynamic power system 53. A model 54 of the fuel cell system 7 with the methanol reformer and the associated components (which are known per se) is stored in the variable power flux controller 38. The model 54 (FIG. 3) has a reaction free memory element of the n-th order $PTn_1$. In each case the torque setpoint value is applied to the input 56 of the model 54 by the vehicle control unit 18. The time constant of the memory element $PTn_1$ is set by an input 55 of the model 54. The memory element $PTn_1$ is also designated by a delay element. The input 56 and the output of the memory element $PTn_1$ are connected to inputs of a control unit 57 which influences the behavior of the dynamic power system 53.

Figure 3:
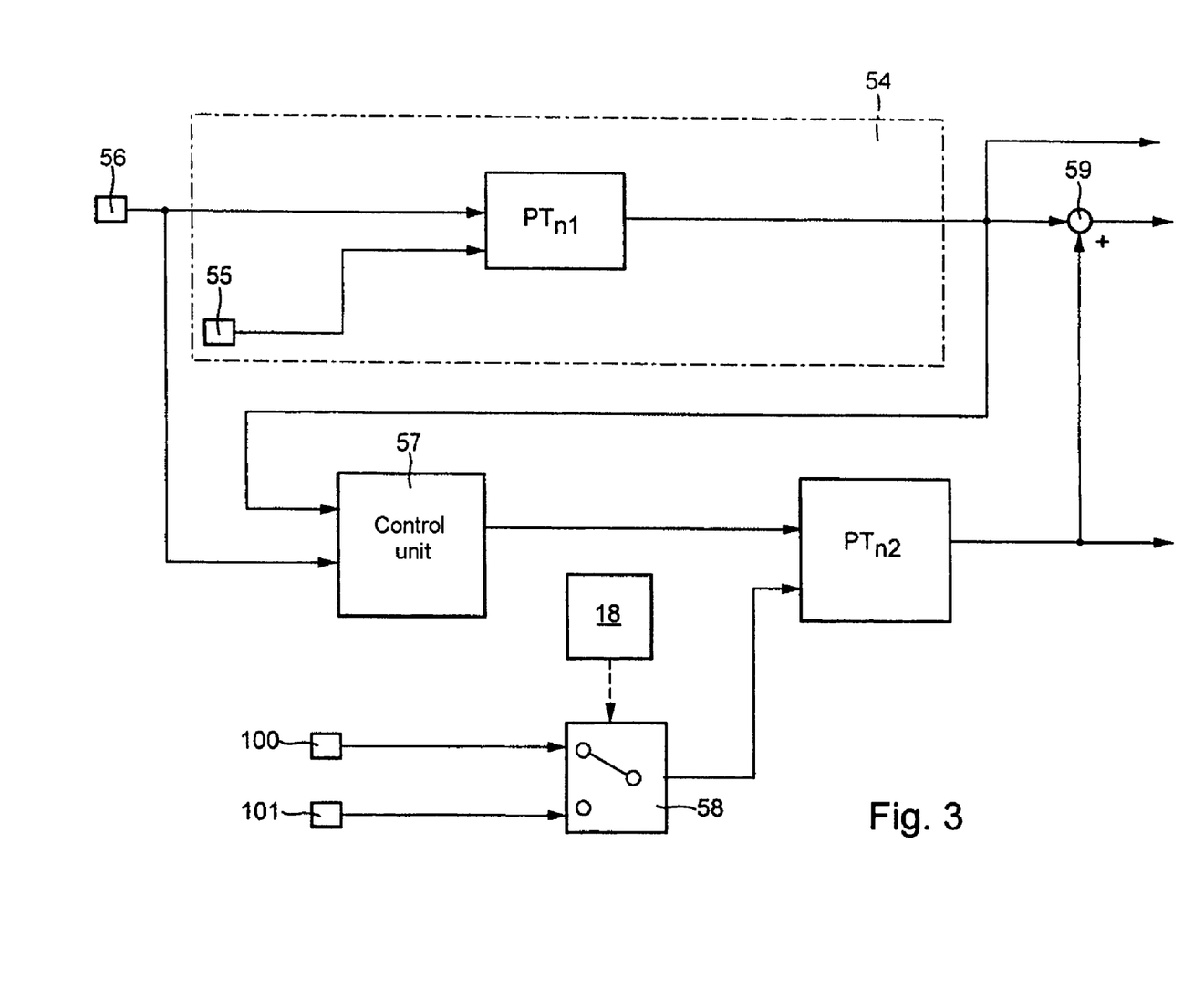
FIG. 3 is a block circuit diagram of a model of a fuel cell system with a methanol reformer and a control unit.

An output of the control unit 57 is connected to a memory element of the n-th order $PTn_2$; the latter has a further input which is connected to a changeover switch 58, which is set by the vehicle control unit 18. The setting depends whether the vehicle 1 is in the antilock braking system mode. Two different time constants are set in the memory element $PTn_2$ by means of the changeover switch 58 by means of the inputs 100 and 101, one of which is set to the dynamics in the normal operating mode of the dynamic power system 53 and the other of which is set to the antilock braking mode. The output of the memory element $PTn_1$ indicates the "slow" reaction of the fuel cell system. The output of the memory element $PTn_2$ indicates the "rapid" reaction of the dynamic power system 53.

The output values of the memory element $PTn_1$ and $PTn_2$ are superimposed one on the other at a summing point 59 which indicates the sum of the "rapid" and "slow" reactions. The output values of the memory elements $PTn_1$ and $PTn_2$ and of the summing point are processed by the variable power flux controller 38, in which case different dynamic operating modes of the vehicle 1 are taken into account. The memory element $PTn_2$ limits the supply of power by the dynamic power system in terms of its dynamics and is also designated by a limiter.

In a first operating mode, which can be designated as an "acceleration boost", the dynamic power system 53 is used to improve the longitudinal dynamics of the vehicle. The dynamic power system 53 is made to output power by the power control units 19 for the duration of an acceleration process (that is, in a temporally limited fashion), such power having an additive effect to the power generated by the fuel cell system 7. In this context, the vehicle control unit 18 controls the torque setpoint value as a function of the available current from the characteristic diagram $M_{Soll}=F(I_{max}, n)$. $I_{max}$ is here the composite current of the fuel cell system 7 and of the dynamic power system 53.

Figure 4:
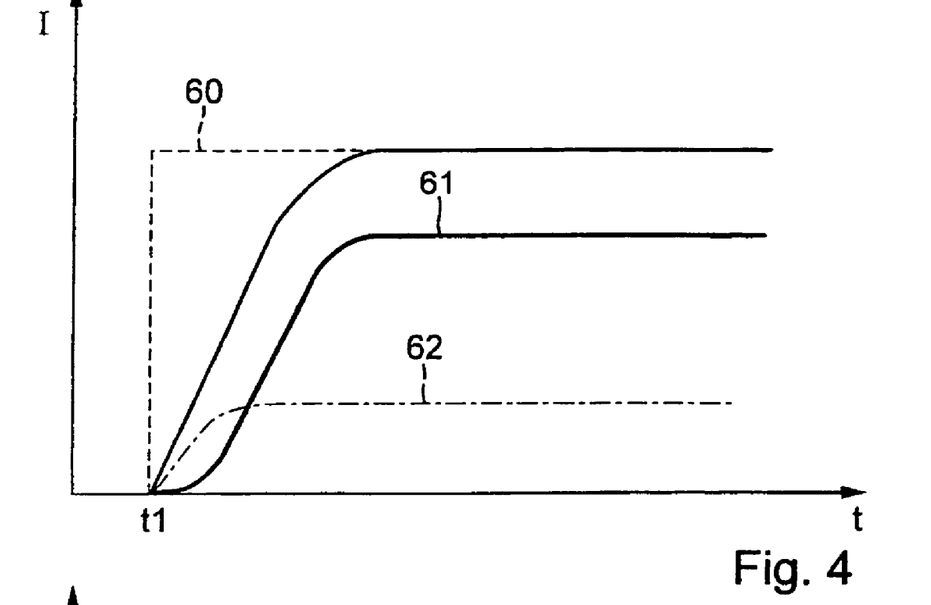
FIG. 4 is a diagram of fuel cell current and power system current for maximum acceleration, as a function of time.

In FIG. 4, the current is shown on the ordinate as a function of the time t on the abscissa. It will be assumed that a setpoint value jump to the setpoint value $I_{AnfF}$, designated by 60 in FIG. 4, takes place at the time $t_1$. In the "acceleration boost" operating mode, the variable power flux controller 38 demands the maximum current of the fuel cell system 7 $I_{BRZMax}$ and the maximum current of the dynamic power system 53 $I_{BattMax}$. The fuel cell current $I_{BZ}$ (61 in FIG. 4), increases to $I_{BRZmax}$ after a response function, which value is registered by the variable power flux controller 38 by reference to the model 54 and the dynamic power system 53 causes the current $I_{Batt}$, designated by 62 in FIG. 4, to be output by means of the setting of the d.c./d.c. converter 9, said current $I_{Batt}$ increasing with the ramp which is determined by the memory element $PTn_2$ and remaining at the current $I_{BattMax}$ for the duration of the "acceleration boost".

Figure 5:
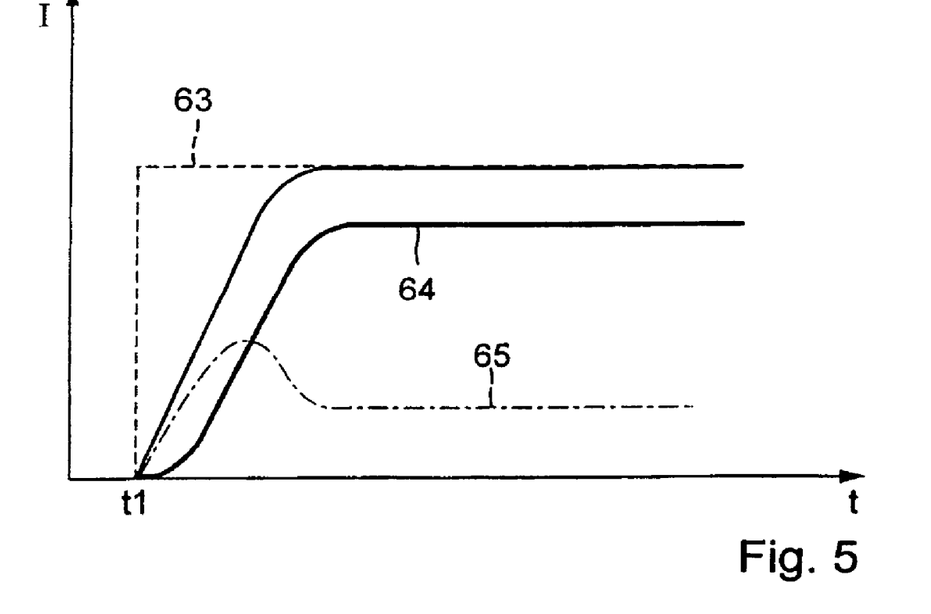
FIG. 5 is a diagram of the fuel cell current and power system current for an acceleration which is below the maximum acceleration.

FIG. 5 shows the current profile as a function of time at a setpoint value jump 53 which is smaller than the sum $I_{BRZMax}+I_{Battmax}$. The variable power flux controller 38 causes the fuel cell to output the current $I_{BRZMax}$. The profile of the current $I_{BRZ}$ is designated by 64 in FIG. 5. The increase takes place with the transition function of the fuel cell system. The dynamic power system 53 generates the current $I_{Batt}$ whose profile is designated by 65 in FIG. 5 and is added to the current $I_{BRZ}$. As a result, the setpoint value 63 is reached more quickly. As soon as the setpoint value 63 has been reached, the fuel cell feeds in the current $I_{BRZMax}$, while the current $I_{Batt}$ returns to a lower value at which it remains for the duration of the acceleration boost.

Figure 6:
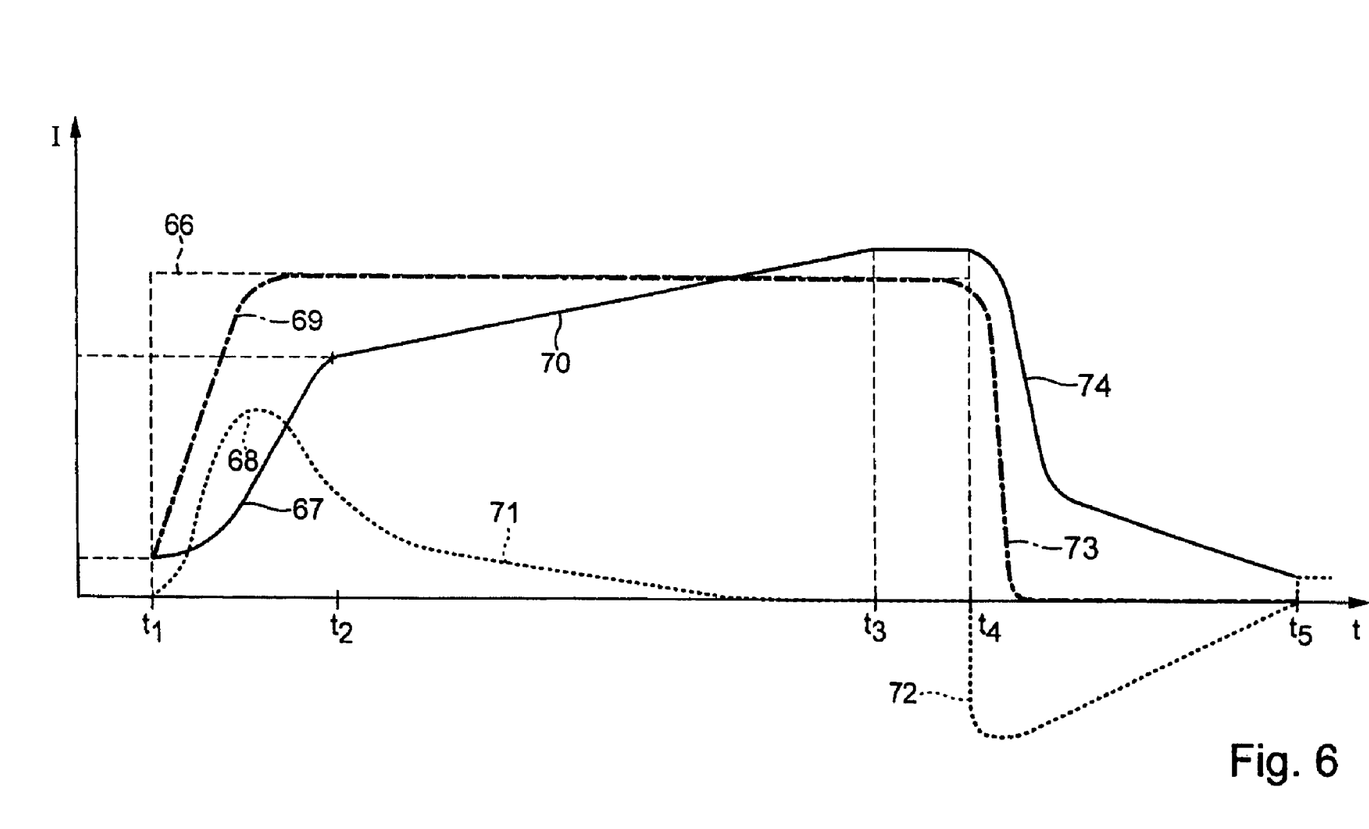
FIG. 6 is a diagram of currents of the fuel cell system of the device and of the power system as a function of time in various operating states.

FIG. 6 shows the profile of currents I of the power supply system of the vehicle 1 and of the drive unit as a function of the time t in various operating modes such as "dynamic boost", "quasi-static operating mode" and "braking mode". It will be assumed that the vehicle control unit 18 demands a current $I_{AnfF}$ for the drive motor at the time $t_1$. The setpoint current $I_{AnfF}$ is designated by 66 in FIG. 1. The variable power flux controller 38 applies a fuel cell demand current $I_{BRZAnf}$ to the actuating elements of the fuel cell system 7, said current permitting the fuel cell current $I_{Verf}$ to increase to a value $I_{BRZDynmax}$ at the time $t_2$ according to the profile designated by 67 in FIG. 6. Starting from the time $t_2$, the variable power flux controller 38 controls the fuel cell current $I_{Verf}$ in such a way that it increases linearly, with an adjustable gradient, to the to the maximum static value $I_{BRZMaxstat}$. This value is reached at the time $t_3$.

From the time $t_1$ to $t_2$, the fuel cell system 7 and the dynamic power system 53 operate in the "dynamic boost" operating mode, in which the dynamic power system 53 is made to output a high battery current $I_{Batt}$ which is added to the current of the fuel cell system $I_{Verf}$. The current $I_{Batt}$ whose profile is designated by 68 in FIG. 6 and which is generated, according to the setting of the memory element $Ptn_2$, with a high rate of increase which is matched to the rate of increase of the fuel cell system supplements the current $I_{Verf}$ to form a current $I_{Vehicle}$ whose profile is represented by 69 in FIG. 6. The dynamics of the vehicle 1 are improved by the dynamic operation with battery support.

From the time $t_2$ to the time $t_3$, the fuel cell system 7 and the dynamic power system 53 operate in the quasi-static operating mode. In this operating mode, the fuel cell system 7 is operated in a nondynamic fashion with support from the dynamic power system 53. As a result, it is possible to save fuel. The fuel cell current $I_{Verf}$ (70 in FIG. 6) increases linearly, and the battery current $I_{Batt}$ (71 in FIG. 6) decreases linearly up to the time $t_3$.

At the time $t_3$ the static operating point of the fuel cell system 7 is reached (i.e., the fuel cell current $I_{Verf}$ has arrived at its maximum value for the current load situation). Given a continuous demand, the fuel cell stream remains constant.

It is assumed that at the time t4 the setpoint current is reduced to zero by a corresponding change in the torque demand. As this point, the dynamic power system is changed over to recuperation (i.e., the power converter 3 feeds back released energy into the high voltage power system). The storage battery 10 is charged by means of the d.c./d.c. converter 9 which is set to a reverse mode. The current $I_{Batt}$ is fed back into the storage battery 10, with limitation to $I_{Battmaxe}$. The profile $I_{Batt}$ is designated by reference numeral 72 in FIG. 6. The current $I_{Vehicle}$ decreases in the so called braking mode of the drive motor according to the profile 73 in FIG. 6. The current $I_{Verf}$ is reduced by the variable power flux controller 38 according to the profile 74 in FIG. 6, in which case in addition to a very steep drop an essentially linear drop takes place up to the time t5 at which for example the current $I_{Aux}$ is still generated. After the decay of the current $I_{Vehicle}$ to zero, the storage battery 10 takes up the current which is still output by the fuel cell system 7, insofar as it exceeds the currents of the further loads. In this manner, it is possible to decrease the torque of the drive motor in a short time when there is a load jump from a high load point to a low load point. The excess power is stored. The chronological behavior of the torque reduction in response to the change in the setpoint value transmitter depends on the vehicle velocity (at higher velocities the reduction taking place more slowly than at low velocities), and on the drive current (more slowly when there are high currents).

The adaptive flow switch compensation according to the invention improves the driving comfort and the regulating stability during operation, in particular with a high load, for example full load. In the case of fuel cells it may be necessary to reverse the direction of the gases through the cells periodically. At the changeover time there is a brief reduction in electrical power, which results in a voltage dip when the load is constant. In a vehicle with a fuel cell the electric driving mode represents the main load. The electronic control of the electric drive must increase the power drain very dynamically when there is a voltage dip in order to maintain a constant torque. In particular when the load points are high, the power dip of the fuel cell has an adverse effect on the entire system:

The drive torque cannot always be kept constant, which results in a reduction in the driving comfort.

The electric drive has to increase its current demand very dynamically, which has a destructive effect on the process of regulating the generation of current.

The invention makes it possible to compensate for brief power dips of the current generating system. As a result, it is also possible to avoid fluctuations in torque on electric drives (locomotion drive but also auxiliary drives) and thus increase the driving comfort. The process of regulating the system for generating current is improved in this way since the current demand as a result of the load (locomotive drive) does not need to be increased and there is thus no interference variable acting on the regulating process.

The adaptive flow switch compensation is carried out according to the invention in order to compensate a power dip of the fuel cell and thus prevent a voltage dip. A controlled power input from the storage battery 10 is generated as a function of the load current of the fuel cell and a flow switch information item relating to the fuel cell. A characteristic curve according to which the level of the current is dimensioned is adapted by observing the resulting voltage at the high voltage end during the flow switch compensation.

The fuel cell system signals an imminent flow switch via a logic signal. At the time of the flow switch, the d.c./d.c. converter is controlled as a function of the instantaneous fuel cell current in such a way that a brief current pulse is additionally input. The shape is stored in a control table and standardized to 1. The height of the pulse is dependent on the present fuel cell current and on the adaptive learning factor. The adaptive learning factor is determined continuously by observing the voltage profile when a flow switch occurs, and it corrects system induced variation and fluctuations. If the deviations exceed a specific limit this is stored as diagnostic information.

A further essential feature of the invention is the under voltage detection and, in conjunction therewith, an additive power input as a function of the fuel cell current by correspondingly regulating the d.c./d.c. converter 10. In a current generating system of the fuel cell, the profile of the voltage is dependent on a very large number of factors as a function of the load current. The dependencies are currently not all capable of being described or predicted mathematically. With the under-voltage regulator according to the invention as a component of the power management system it is possible to increase the reliability and availability of the system. In addition it is possible to react actively during operation to system properties which change adversely. As a result it is possible to increase the availability of the system and determine information for service and maintenance during operation. The main function of the under-voltage regulator according to the invention is to add power from the battery 10 when a lower limiting value of the voltage is reached. In this context, the current balance is not taken into account. The regulator output outputs an additive current demand to the d.c./d.c. converter 9, and is dependent on the control error ($\Delta U$) and the present load current.

A further component of the invention is a means of detecting how frequently and in which situations the regulator must intervene, for example as a function of the load variable, temperature, air pressure, and humidity (environmental conditions). Data for service and maintenance from this information is stored. When a specific frequency value is exceeded, (i.e., the regulator is >N times active per time unit), active interventions are performed in dynamics and maximum power is provided with the objective of ensuring the availability of the system. The restriction of the available power is suitably indicated to the driver.

The battery current proportion is controlled in such a way that the balancing of the current is always correct independently of changes in parameter of the overall system. The d.c. value of the drive system is of particular significance as an actual value. The necessary current proportion of the battery 10 is calculated by balancing the actual current $I_{Vehicle}$ and the available current of the fuel cell system $I_{Verf}$. As a result, the regulation concept intentionally allows for continuous infringement of the current balance.

Although the actual value has a chronological delay, this method has proven significantly more suitable than calculating the setpoint values for the battery current proportion in advance. Although at first a reaction variable (drive current) must be present for the functioning of the method described, the method operates very effectively since the reaction time of the manipulated variable (battery current proportion controlled by means of the d.c./d.c. converter 9) is significantly below the storage time constant of the fuel cell system (capacity of energy of the fuel cell system). The current balance of the fuel cell system 7 is as a result ensured in an optimum way. The advantages lie in a precise energy balance, which is very important in particular for reformer systems. Basically a precise energy balance in the fuel cell system increases the efficiency and the service life of the reformer.

Given knowledge as to which quantities of energy are required with which dynamics, the dynamic power system 53 can be controlled selectively, or the power demand can be suitably adapted to the fuel cell system 7.

In the case of ABS braking, the driven wheels may begin to slip. There are technical regulating methods which calculate a correction/increase torque in such a case, and transmit it to the drive. In response, the drive usually briefly accelerates the wheels in order to decrease the slip. As a result, the wheels may, for example, increase lateral guidance again. In this case, only a small quantity of energy and a power level which can be output by a correspondingly configured dynamic power system is necessary in a chronologically limited form (usually only in the case of the initiation of braking). The dynamics of the power which is made available must however be very high.

The method according to the invention is characterized in that the vehicle control unit 18 and the power control unit 19 process information or additionally acquire information themselves:

1. In the case described above the vehicle control unit feeds, for example, one bit "ABS active" to the power control unit 19. As a result, the "increasing" setpoint current demand which is transferred simultaneously is not passed on to the fuel cell system 7; instead it "knows" that the demand is a short dynamic, chronologically limited demand of the vehicle control unit 18, and covers this demand best by means of a battery 10. Thus, the power of the nondynamic fuel cell system 7 is not unnecessarily increased or decreased in the case of loads of this type.
2. The vehicle control unit 18 switches the time constant of the limiter of the $PTn_2$ element to the smallest possible value which the dynamic power system 53 can represent/follow. As a result:
   there is an improvement in the efficiency level of the fuel cell system 7 and a reduction in the consumption.
   The service life of the fuel cell system is prolonged.
   There is an improvement in the dynamics in comparison to a fixed time constant of the memory element $PTn_2$ which "fits the fuel cell system".
   Improvement in exhaust gas.

Further application cases or information which is processed in a suitable way are:

Economy/sporty mode "information bit": Economy mode: lower power non-dynamic use of the dynamic power system. Sporty mode: opposite of the above. (Switch in the center console) stop and go mode: control determines by means of the torque data, current data, rotational speed data, velocity data and their differential quotients whether the operating mode is a stop and go operating mode (driving in a traffic jam). The power control unit 19 then sets an "average" nondynamic setpoint current demand and switches on the fuel cell system 7. The "low power" acceleration and braking processes are covered by dynamic demand levels of the dynamic power system 53. As a result:
   there is an improvement in the efficiency level, reduction in consumption,
   improvement in exhaust gas.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An apparatus for controlling a power supply of a device having at least one electric drive motor and a hybrid power supply system which includes a fuel cell system and a dynamic power system, wherein electrical outputs of the fuel cell system are connected to one side of a power converter whose other side feeds the drive motor which is controlled by a motor control unit, and wherein the dynamic power system has a storage battery which is connected to one side of a d.c./d.c converter whose other side is connected to the electrical outputs of the fuel cell system and to one side of the power converter, wherein:

a vehicle control unit which is connected to a velocity sensor of the mobile device and to a signal transmitter for a setpoint torque to be generated by the drive motor, is provided for setting a setpoint torque of an motor control unit and for determining current setpoint values for the mobile device which are stored in a characteristic diagram for torque setpoint values and rotational speed values;

the vehicle control unit is connected to a power control unit which is connected to the fuel cell system, a battery management system for the storage battery and to the d.c./d.c. converter;

current which is output by the fuel cell is measured and is fed as a fuel cell current value to the power control unit;

current of the drive motor is measured upstream of the power converter and is fed as a driving current value to the power control unit;

current of the other loads is measured or calculated and fed to the power control unit as a composite current value;

an operating mode selector switch for setting various operating modes of the power supply system is connected to the power control unit;

values from the battery management system relating to the charge state of the storage battery and values relating to the maximum prescribable charge current and discharge current are fed to a power flux controller;

a power setpoint value, fuel cell current, driving current, a composite current value, an operating mode which is set, a charge state value and the maximum prescribed values of the charge current and discharge current are processed in the power control unit and in an associated power flux controller with one or more programs, such that, when there is a change in the setpoint power a difference between partial power which can be generated by the fuel cell system, with a delay according to the response function, and the setpoint power is generated by the storage battery of the dynamic power system by applying corresponding setpoint values to the d.c./d.c. converter, with reference to the power of the drive motor which has already been output and the power of the fuel cell system which has already been generated as well as the velocity of the device, and taking into account the selected type of dynamic behavior and the different transition functions of the fuel cell system and of the dynamic power system.

2. The apparatus as claimed in claim 1, wherein the mobile device is a motor vehicle.

3. The apparatus as claimed in claim 1, wherein the mobile device is a forklift truck.

* * * * *